United States Patent [19]

Alperson

[11] Patent Number: 4,692,056
[45] Date of Patent: Sep. 8, 1987

[54] GARMENTS HANG-RAIL COUPLING

[76] Inventor: Joel H. Alperson, 3306 S. 157th St., Omaha, Nebr. 68130

[21] Appl. No.: 890,381

[22] Filed: Jul. 29, 1986

[51] Int. Cl.⁴ ............................................. F16B 9/02
[52] U.S. Cl. .................................. 403/233; 403/353; 403/237; 211/105.1
[58] Field of Search ............... 211/206, 189, 193, 195, 211/100, 99, 105.1, 123; 403/232.1, 233, 234, 235, 237, 247, 398, 79, 353, 391, 399, 383; 248/201

[56] References Cited

U.S. PATENT DOCUMENTS

| | | | |
|---|---|---|---|
| 534,507 | 2/1895 | Hoagland | 403/353 |
| 1,687,772 | 10/1928 | Judelson | 403/353 |
| 1,781,408 | 11/1930 | Morris et al. | 403/247 X |
| 2,486,077 | 10/1949 | Taylor | 403/398 X |
| 2,611,160 | 9/1952 | Hanesse | 403/237 |
| 3,685,662 | 8/1927 | Varon et al. | 211/105.1 |
| 4,078,866 | 3/1978 | Hawkins | 403/79 |
| 4,196,556 | 4/1980 | Russo | 403/247 X |
| 4,261,470 | 4/1981 | Dolan | 403/237 X |
| 4,454,700 | 6/1984 | Kern | 403/237 X |
| 4,525,971 | 7/1985 | Kern | 403/237 X |

Primary Examiner—Cornelius J. Husar
Assistant Examiner—Joseph A. Fischetti
Attorney, Agent, or Firm—George R. Nimmer

[57] ABSTRACT

Garments hang-rail coupling securely removably mountable at the forward portion of each of a plurality of parallel conventional horizontal brackets respectively forwardly provided with an upstanding lug such as hook or cube. The coupling forward portion includes an upwardly open trough adapted to removably support a conventional garments hang-rail. The coupling rearward portion includes a housing having forward and rearward open-ends, there being opposed side-panels rigidly attached to lower rearward portions of the trough. The housing also includes a roof-panel spaced a finite-gap rearwardly from the trough to accommodate the bracket upstanding lug and also includes a rearwardly positioned base extending between the side-panels and adapted to abuttably underlie the bracket. The coupling housing might be augmented with optional desireable features such as bracket abutting setscrew, and with novel panel and base configurations permitting ready insertion and secure mounting of the coupling to such forwardly lugged brackets.

11 Claims, 12 Drawing Figures

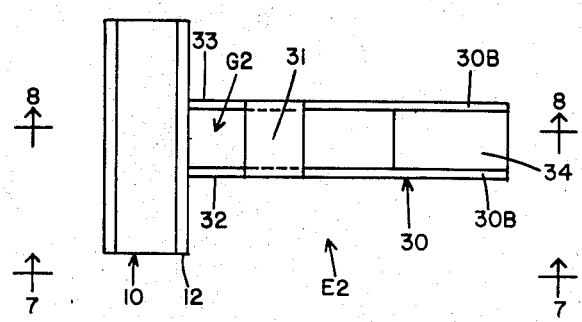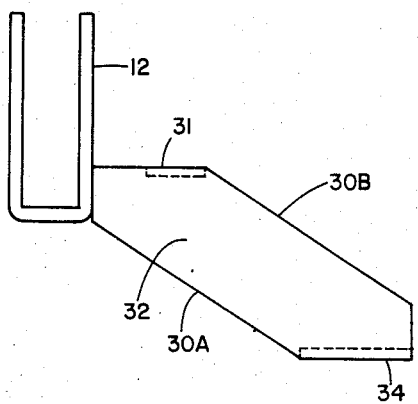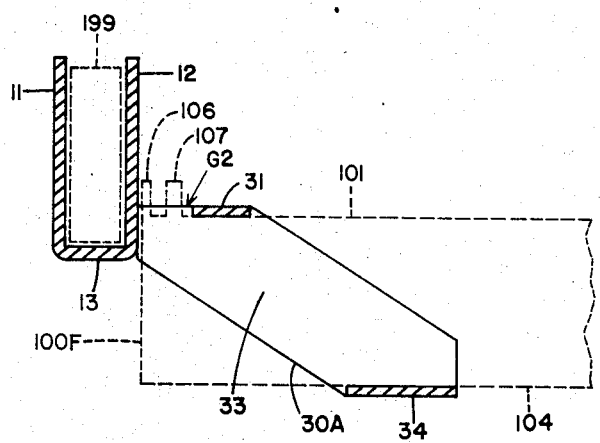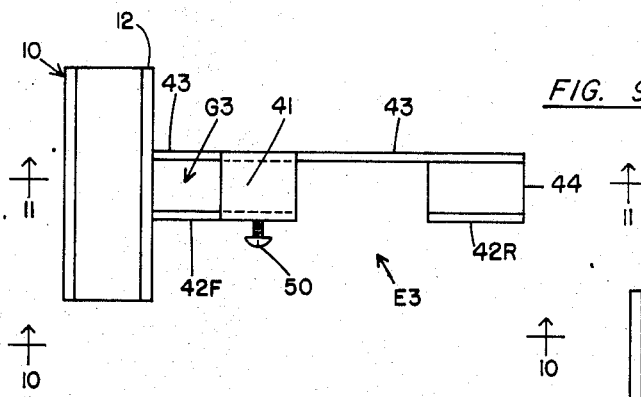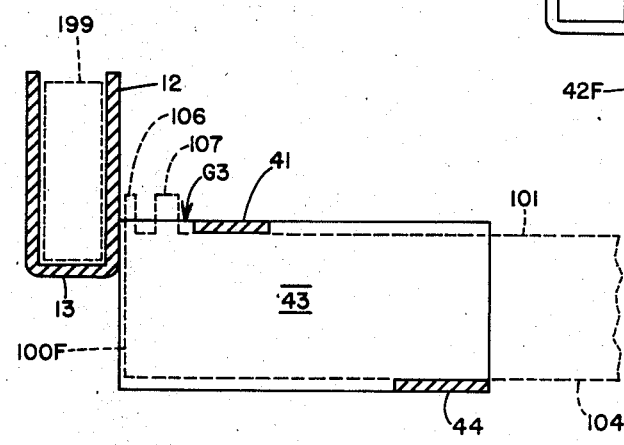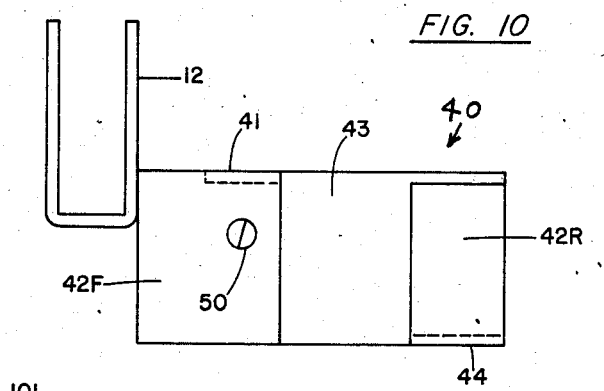

GARMENTS HANG-RAIL COUPLING

BACKGROUND OF THE INVENTION

When hanger-engaged blouses and similar garments are displayed in retail stores, the hanger-engaged garments can be hung from horizontal brackets (e.g. 99) extending horizontally perpendicularly to an upright standard (e.g. a wall) or from horizontal hang-rails (e.g. 199) extending parallel to a wall means.

Drawing FIG. 1A represents a perspective view of a conventional retail display bracket (99) for supporting blouses or other hanger-engaged garments. Bracket 99 comprises a horizontal bar 100 terminating as an upright frontal-end 100F and being cross-sectionally rectangularly defined by four planar sides including: left-side 102, right-side 103, bottom-side 104, and top-side 101. For removably attaching the bracket bar (100) horizontally perpendicularly to some upright standard (e.g. a wall), the bracket includes an apt rearward-end such as, for example, a multi-apertured upright flange (109) for nailing or other fastening to the upright standard means. The mounted bracket horizontal bar (100), immediately rearwardly of the frontal-end (100F), is provided with a lug means (e.g. 106, 107) extending uprightly from top-side 101 and to prevent the hanger-engaged garments from falling off the bar frontal-end. 106 indicates a hook-type lug means, and 107 indicates an alternate cubical-type lug means.

Drawing FIG. 1B represents a perspective view of a conventional retail display hang-rail (199) customarily mounted with hang-rail fittings (not shown) in parallelism with upright wall means and similarly adapted to support hanger-engaged garments therealong. Such hangrail-fittings are commonly of cumbersome configuration and present difficulties in the desired parallel mounting to the wall means, and are usually relatively expensive. Though retailers recognize the potential space-saving economy of hang-rails (e.g. 199), there is the serious ancillary problem of the cumbersome, unreliable, and expensive hang rail-fittings.

OBJECT OF THE INVENTION

It is accordingly the general objective of the present invention to provide a coupling that might be removably conveniently reliably and economically employed with each of a plurality of wall-perpendicular retail display brackets whereby such brackets might additionally support a wall-parallel hang-rail for hanger-attached garments.

GENERAL STATEMENT OF THE INVENTION

With the above general objective in view, and together with other specific and ancillary objectives which will become more apparent as this description proceeds, the garments hang-rail coupling generally comprises: as the coupling forward portion, an upwardly open trough adapted to removably support a garments hang-rail extending perpendicularly to each wall-perpendicular bracket; a tubular housing including substantially parallel side-panels having their forward portions rigidly attached to the trough and adapted to lie alongside the bracket left-side and right-side, said housing also including a roof-panel attached to both side-panels and adapted to abuttably overlie the bracket, the roof-panel being a finite-gap rearwardly from the trough to accommodate the bracket upstanding hook and/or cube lug, and rearwardly remote base means (such as bottom-panel or threaded bolt) extending between the side-panels and adapted to abuttably underlie the bracket; and together with desireable optional features such as setscrew means, novel panel configurations for the housing, etc.

BRIEF DESCRIPTION OF THE DRAWING

In the drawing, wherein like characters refer to like parts in the several views, and in which:

FIG. 6 is a top plan view of a second embodiment of the garments hang-rail coupling of the present invention;

FIG. 7 is a left side elevational view of the FIG. 6 second embodiment and taken along line 7—7 of FIG. 6;

FIG. 8 is a sectional elevational view taken along line 8—8 of FIG. 6, the FIGS. 1A and 1B items being in phantom line;

FIG. 9 is a top plan view of a third embodiment of the garments hang-rail coupling of the present invention;

FIG. 10 is a left side elevational view of the FIG. 9 third embodiment and taken along line 10—10 of FIG. 9; and FIG. 11 is a sectional elevational view taken along line 11—11 of FIG. 9, the FIGS. 1A and 1B items being in phantom line.

DETAILED DESCRIPTION OF THE DRAWING

Figure 1A:
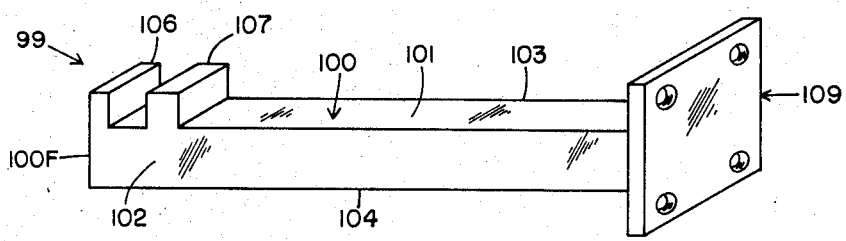
FIGS. 1A and 1B are perspective views of the afore-described prior art bracket and hang-rail.
Figure 1B:
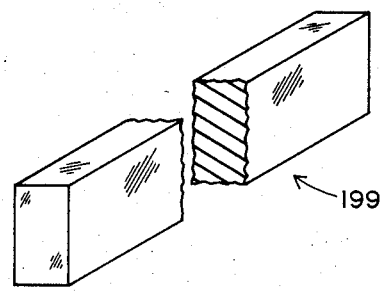
Figure 5:
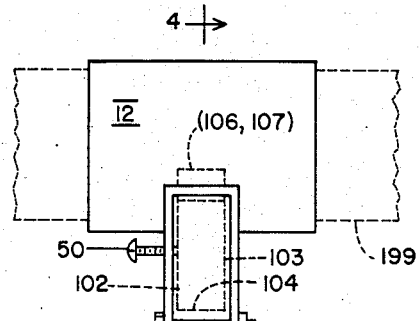
FIG. 5 is a rearward elevational view taken along line 5—5 of FIG. 4.
Figure 4:
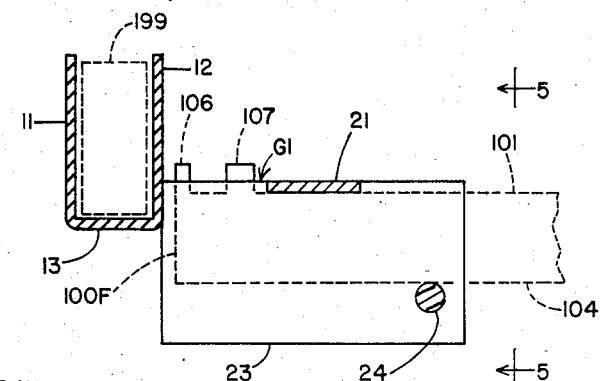
FIG. 4 is a sectional elevational view taken along lines 4—4 of FIGS. 2 and 3, the FIGS. 1A and 1B items being shown in phantom line.
Figure 2:
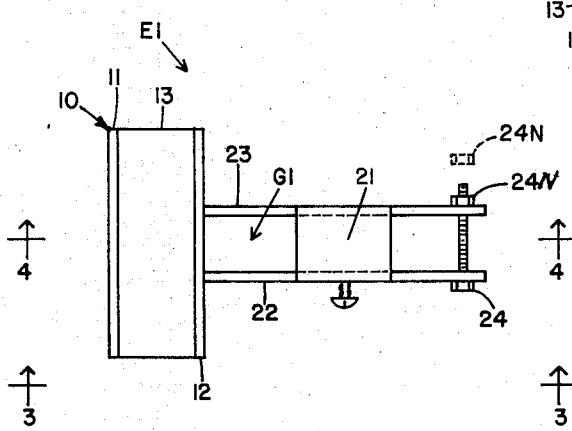
FIG. 2 is a top plan view of a first embodiment of the garments hang-rail coupling of the present invention.
Figure 3:
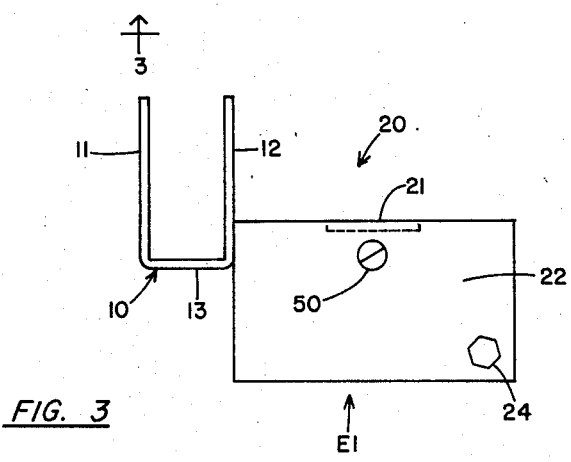
FIG. 3 is a left side elevational view of the FIG. 2 first embodiment and taken along line 3—3 of FIG. 2.

Representative first embodiment "E1" of FIGS. 2-5 comprises (as the coupling forward portion) an upwardly open trough 10 adapted to removably receive a garments hang-rail (199), and (as the coupling rearward portion) a housing having forward and rearward open ends and adapted to removably securely surround an upwardly lugged (106, 107) garments bracket (e.g. 99).

Trough portion 10 comprises an upright front-wing 11, an upright rear-wing 12, and a closed floor 13 whereby such upwardly open trough is adapted to securely downwardly receive a garments hang-rail (199).

Housing 20 for first embodiment "E1" comprises substantially parallel planar side-panels including a left-panel 22 and a right-panel 23, each side-panel at the forward terminus being rigidly attached (as by welding) to the trough rearward lower portion (e.g. at rear-wing 12). Side-panels 22 and 23 are adapted to lie substantially parallel alongside the respective upright sides 102 and 103 of a garment bracket (e.g. 99). Housing 20 also comprises a roof-panel 21 attached to side-panels 22 and 23, there being a finite-gap G1 between roof-panel 21 and trough 10 to accommodate the bracket upright lug means (e.g. 106, 107). Accordingly, roof-panel 21 is adapted to abuttably overlie bracket top-side 101 immediately rearwardly of the lug means.

Housing 20 also includes a base means extending between lower portions of side-panels 22 and 23 and adapted to abuttably underlie the bracket bottom-side 104. For embodiment "E1", the base means comprises a headed bolt 24 passing through side-panels 22 and 23 and threadedly engageable with a nut 24N bearable against right-panel 23. The respective housing base means (e.g. 24, 34, 44) are relegated wholly remotely rearwardly of the roof-panels (e.g. 21, 31, 41). Such rearwardly relegated base means facilitates insertion and engagement of the forwardly lugged bracket (e.g. 99) with the coupling (e.g. "E1", "E2", "E3") as will be explained later.

Coupling second embodiment "E2" of FIGS. 6–8 comprises a said upwardly open trough (e.g. 10) and (as the coupling rearward portion) a housing 30 having forward and rearward open-ends. Housing 30 comprises substantially parallel planar side-panels including left-panel 32 and right-panel 33. As best seen in FIG. 7 elevational view, for each geometrically symmetrical six-edges side-panel (32, 33), the predominate peripheral extent is provided by two substantially parallel and downwardly rearwardly sloping inclined-edges 30A and 30B. Each said side-panel, at an upright frontal-edge, is rigidly attached (as by welding) to the trough rearward lower portion (e.g. at rear-wing 12). Side-panels 32 and 33 are adapted to lie substantially alongside the respective upright sides 102 and 103 of a garments bracket (e.g. 99). Housing 30 also comprises a roof-panel 31 attached to minor length upper horizontal-edges of side-panels 32 and 33, there being a finite-gap gap G2 between roof-panel 31 and trough 10 to accommodate the bracket upright lug means (106, or 107). Roof-panel 31, which commences at the upper forward terminus of inclined-edge 30B, is adapted to abuttably overlie bracket top-side 101 immediately rearwardly of the bracket lug means. The base means for housing 30 comprises a horizontal bottom-panel 34 commencing at the lower rearward terminus of inclined-edge 30A. In view of the so constructed housing 30, and particularly for its side-panels 32 and 33, usage of a setscrew (50) is normally unnecessary for securing removable reliable engagement between coupling embodiment "E2" and a said bracket (e.g. 99).

Coupling embodiment "E3" of FIGS. 9–11 comprises a said upwardly open trough (e.g. 10) and (as the coupling rearward portion) a housing 40 having forward and rearward open-ends. Housing 40 comprises substantially parallel planar rectangular side-panels including a rearwardly lengthier right-panel 43 and a shorter left-panel 42F respectively having their upright frontal-edge rigidly attached (as by welding) to the trough lower portion (e.g. at rear-wing 12). Right-panel 43 is adapted to lie alongside bracket upright side 103, and the spatially separated co-planar left-panels (42F and 42R) are adapted to lie alongside bracket upright side 102. Housing 40 also comprises a roof-panel 41 attached to upper horizontal-edges of side-panels 43 and 42F, there being a finite-gap G3 between roof-panel 41 and trough 10 to accommodate the bracket upright lug means (106, or 107). Roof-panel 41 is adapted to abuttably overlie bracket top-side 101 immediately rearwardly of the bracket lug means. The base means for housing 40 comprises a bottom-panel 44 attached and relegated to a rearward portion of right-panel 43 and also attached to the lower horizontal-edge of upright panel 42R.

Secure removable engagement of the coupling ("E1", "E2", "E3") with a horizontally extending and stationarily mounted bracket (e.g. 99, 109) might be readily accomplished according to the following procedure:

(a) the operator holds the coupling in an inclined condition wherein its housing rearward open-end is at common elevation with the bracket frontal-end 100F and wherein the roof-panel (21, 31, 41) slopes downwardly toward the bracket top-side 101, (b) the operator moves the inclined coupling rearwardly to surround the bracket frontal portion and he stops his rearward movement when the coupling finite-gap (G1, G2, G3) directly vertically overlies the bracket upstanding lug means (106, or 107), and then (c) the operator tilts the coupling downwardly to a horizontal condition whereby the bracket upstanding lug means emerges through the coupling finite-gap and the coupling roof-panel abuttably overlies the bracket top-side (101) rearwardly of said lug means (106, or 107). However, for embodiments "E1" and "E3", a setscrew means 50 passing through a housing side-panel, might be optionally additionally employed to enhance such secure removable surrounding relationship of the coupling to the lugged bracket. Coupling disengagement is quickly effected by reversing the aforedescribed stepwise procedure including reversals of coupling movements.

As previously alluded to, each of a plurality of such parallel mounted brackets (e.g. 99) can be frontally provided with a coupling ("E1", "E2", "E3") whereby the aligned coupling troughs (e.g. 10) together removably support a hang-rail (e.g. 199) in perpendicular relationship to said coupling equipped brackets.

From the foregoing, the construction and operation of the garments hang-rail coupling will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. A garments hang-rail coupling securely removably mountable at the forward portion of each of a plurality of parallel horizontal brackets, each said bracket forward portion terminating as a frontal-end and being cross-sectionally rectangularly defined by left-side, right-side, bottom-side, and also by a top-side that is forwardly provided with upstanding lug means, said garments hang-rail coupling comprising:

(A) as the coupling forward portion, an upwardly open trough adapted to removably support a garments hang-rail extending perpendicularly to the bracket at the frontal-end thereof; and (B) a housing having forward and rearward open-ends, said housing being rigidly attached at and depends from a rearward portion of said trough, said housing including:

(i) a substantially horizontal roof-panel located a finite-gap rearwardly of the housing forward open-end whereby the roof-panel is adapted to abuttably overlie the bracket top-side rearwardly of said upstanding lug means, (ii) substantially parallel upright side-panels including a left-panel and right-panel having their upper portions rigidly attached to said roof-panel and having their forward portions rigidly attached to said trough, said left-panel and right-panel being adapted to lie alongside said bracket left-side and right-side, respectively, and (iii) base means extending substantially horizontally between lower portions of said side-panels and being adapted to abuttably underlie the bracket bottom-side, and said base means being relegated remotely rearwardly of said roof-panel thereby facilitating insertion of said forwardly lugged bracket through the housing rearward open-end and permitting emergence of said lug means into said housing upper finite-gap.

2. The coupling of claim 1 wherein the housing base means comprises a bottom-panel rigidly attached to said side-panels.

3. The coupling of claim 2 wherein each side-panel is of six-edges polygonal geometric shape and including a minor length upright frontal-edge rigidly attached to said trough and predominately peripherally including a pair of substantially parallel and downwardly rearwardly sloping inclined-edges that define the rearwardly relegated location for said bottom-panel base means.

4. The coupling of claim 3 wherein each six-edges polygonal side-panel is geometrically symmetrical whereby each edge is parallel to another edge.

5. The coupling of claim 1 wherein the housing base means comprises a threaded bolt passing through both said side-panels, said threaded bolt being provided with a removably engaged threaded nut that is abuttable against a side-panel.

6. The coupling of claim 1 wherein said trough comprises a vertical front-wing in substantial parallelism to a vertical rear-wing; wherein the side-panels are attached to said rear-wing; and wherein at least one of said housing side-panels is provided with setscrew means adapted to bear against said bracket forward portion.

7. A garments hang-rail coupling securely removably mounted in combination with the forward portion of each of a plurality of parallel horizontal brackets, each said bracket forward portion terminating as a frontal-end and being cross-sectionally rectangularly defined by left-side, right-side, bottom-side, and also by a top-side that is forwardly provided with upstanding lug means, said garments hang-rail coupling comprising:

(A) as the coupling forward portion, an upwardly open trough adapted to removably support a garments hang-rail extending perpendicularly to the bracket at the frontal-end thereof, said trough including a pair of upright wings; and (B) a housing having forward and rearward open-ends, said housing being rigidly attached to and depending from a lower rearward portion of said trough, said housing including:

(i) a substantially horizontal roof-panel located a finite-gap rearwardly of the housing forward open-end whereby the roof-panel abuttably overlies the bracket top-side immediately rearwardly of the upstanding lug means, (ii) substantially parallel upright side-panels including a left-panel and a right-panel having their upper portions rigidly attached to said roof-panel and having their forward portions rigidly attached to a said trough upright wing, said left-panel and right-panel lying alongside said bracket left-side and right-side, respectively, and (iii) base means extending substantially horizontally between lower portions of said side-panels and abuttably underlying the bracket bottom-side, and said base means being relegated rearwardly of said roof-panel.

8. The combination of claim 7 wherein the coupling housing base means comprises a bottom-panel rigidly attached to the coupling side-panels, said bottom-panel abutting upwardly against a bottom-side of said bracket.

9. The combination of claim 8 wherein each coupling side-panel is of six-edges polygomal geometric shape and including a minor length upright frontal-edge rigidly attached to said coupling trough and predominately peripherally including a pair of substantially parallel and downwardly rearwardly sloping inclined-edges that define the rearwardly relegated location for said coupling bottom-panel.

10. The combination of claim 9 wherein each six-edges polygonal side-panel is geometrically similar whereby each edge is parallel to another edge.

11. In removable combination with the forward portion of an elongate horizontal bracket that is forwardly provided with an upstanding lug means, said bracket forward portion immediately rearwardly of said lug means being rectangularly cross-sectionally defined by a left-side, a right-side, a bottom-side, and a top-side, a coupling frontally attachable to a garments supporting means and said coupling including a housing having a rearward open-end and also a forward open-end attachable to a said garments supporting means, and said housing comprising:

(i) abuttably overlying the bracket top-side immediately rearwardly of said upstanding lug means, a horizontal roof-panel relegated a finite-gap rearwardly of the housing forward open-end;

(ii) lying alongside the bracket left-side and right-side, substantially parallel upright side-panels including a left-panel and a right-panel and each side-panel being of a geometrically similar six-edges polygonal shape defined by: a pair of substantially parallel and downwardly rearwardly sloping inclined-edges, an upright front-edge at the housing forward open-end, an upright rear-edge at the housing rearward open-end, a horizontal upper-edge attached to said roof-panel, and a rearwardly disposed horizontal lower-edge attached to a horizontal bottom-panel; and (iii) abuttably underlying the bracket bottom-side and relegated wholly rearwardly of said top-panel, a said bottom-panel located at the housing rearward open-end.

* * * * *